P. S. BAUER.
AUTOMATIC STEERING DEVICE FOR MOTOR VEHICLES.
APPLICATION FILED SEPT. 1, 1920.
1,418,693.    Patented June 6, 1922.
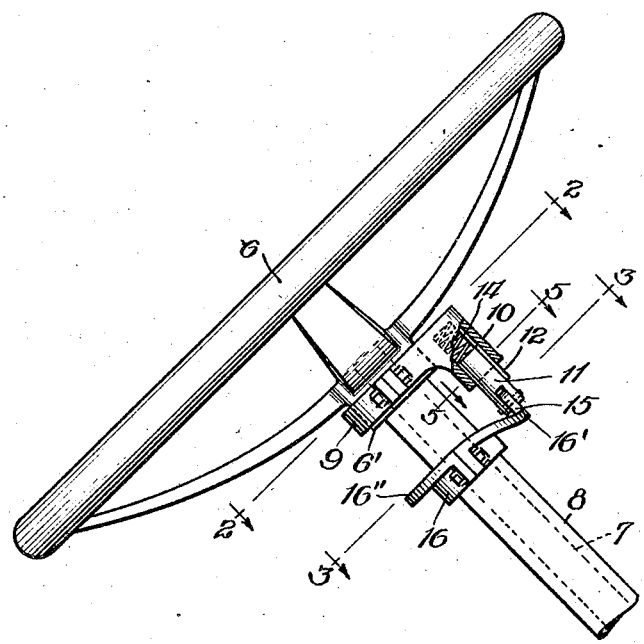
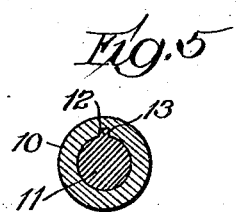
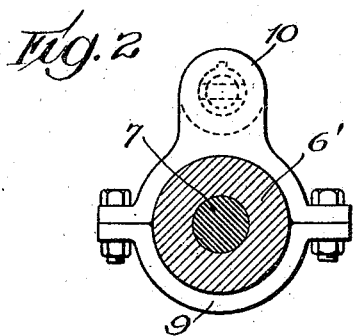
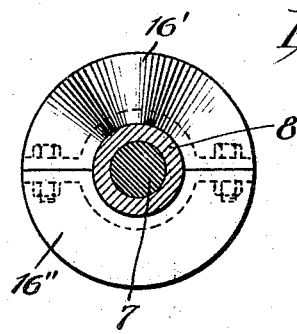
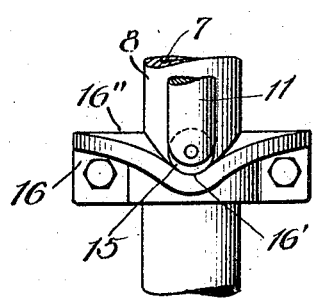
Inventor
Perry S. Bauer

UNITED STATES PATENT OFFICE.

PERRY S. BAUER, OF CHICAGO, ILLINOIS.

AUTOMATIC STEERING DEVICE FOR MOTOR VEHICLES.

1,418,693.  Specification of Letters Patent.  Patented June 6, 1922.

Application filed September 1, 1920. Serial No. 407,448.

*To all whom it may concern:*

Be it known that I, PERRY S. BAUER, a citizen of the United States, residing at Chicago, in the county of Cook and State of Illinois, have invented certain new and useful Improvements in Automatic Steering Devices for Motor Vehicles, of which the following is a specification.

It is a well-known fact that ruts, soft spots and loose stones and other irregularities and inequalities in the road surface have a tendency to direct the travel of a motor vehicle out of a straight course and the constant attention of the driver is required to keep to a straight course. This involves more strain on the arms of the driver with some motor vehicles than with others and necessitates a more or less firm grasp of the steering wheel whereby many of the jolts and jars incident to travel are communicated to the driver through the steering wheel and produce arm strain. These conditions result not only from the effort to hold the vehicle in a straight course of travel but also in restoring the vehicle to a straight course when it has been diverted therefrom intentionally or otherwise.

The object of my invention is to simplify the steering of motor vehicles by providing means of simple character for holding the vehicle to a straight course of travel and for automatically returning the vehicle to a straight course of travel when it has been diverted therefrom.

Further objects of the invention are to provide means of simple character which can be easily applied to the steering wheel and standard of a motor vehicle for easing the efforts of the driver to steer the vehicle and maintain it in a straight course of travel and to relieve the driver of strains due to jars and jolts to which the front wheels and steering devices of motor vehicles are subjected in travel.

The invention has other objects in view which will be referred to hereinafter in the detail description of the selected embodiment of the invention in the accompanying drawings, in which—

Fig. 1 is partly in section and illustrates the invention applied to a steering wheel and standard of an ordinary type;

Fig. 2 is an enlarged sectional view on the line 2—2 of Fig. 1;

Fig. 3 is an enlarged sectional view on the line 3—3 of Fig. 1;

Fig. 4 is an enlarged detail view;

Fig. 5 is a detail sectional view on the line 5—5 of Fig. 1.

Referring to the drawings, 6 is the steering wheel which is mounted on a staff 7 in a suitable standard 8 and is typical of steering devices of motor vehicles now in general use. A clamp 9 is detachably secured on the collar 6' of the steering wheel and is provided with a housing 10. A plunger 11 is slidably arranged in the housing but is prevented from turning therein by the tongue 12 operating in groove 13. A spring 14 within the housing bears upon the upper end of the plunger. A roller 15 is mounted in the outer end of the plunger. A cam 16 is rigidly secured on the standard 8 and it is preferably provided with a depressed part 16' and a flat part 16''.

The parts are preferably assembled in the manner shown in Fig. 1 with the depressed part of the cam located at the upper side of the standard and the housing and plunger positioned thereabove so that the roller 15 will normally seat in the lowest part of the cam, as shown more clearly in Fig. 4. In this position the steering devices are centered so that the vehicle will be caused to travel in a straight course. When the steering wheel is turned in either direction the plunger will travel up the inclined part of the cam onto the flat part thereof, the inclines approximating a quarter turn each side of the seat 16' which I now consider sufficient for the purposes of my invention. It will readily be understood that the resistance afforded by the plunger and cam will be sufficient to automatically hold the steering wheel in its normal position and to overcome the tendency of the front wheels of the vehicle to be diverted from a normal straight course by irregularities and inequalities in the road. And when the driver operates the steering wheel to slightly change the course of travel, in avoiding slight obstructions, glass, etc., the invention will restore the wheel to normal position immediately after the driver relaxes his grasp on the wheel, thus greatly simplifying the steering operation.

It should be noted that the resistance above referred to is proportioned to the purposes for which it is intended and that it does not increase when the steering wheel is operated to turn a corner. After the plunger has traveled up the incline, which involves approximately a quarter turn of the steering wheel, it will thereafter travel on the flat part of the cam without increase of resistance while the wheel is being turned sufficiently to steer the vehicle around a corner. Thus the necessary steering operation for turning corners is not interfered with or rendered more difficult or tiresome by the addition of my invention to the steering devices but on the contrary this steering operation is simplified and facilitated because of the fact that the invention will automatically center the steering devices as they are restored to normal position without especial effort on the driver's part. The resistance increases only as the plunger travels up the incline and remains constant as the plunger travels over the flat portion of the cam. To avoid bad spots and obstructions in the road, the driver will ordinarily turn his wheel as required and this causes the plunger to travel up the incline and tension the spring so that when the driver releases his pressure on the steering wheel the plunger is caused to travel down the incline to its seat in the cam and thus immediately restore the steering devices to centered position. If one of the front wheels of the vehicle should hit a bad spot or an obstruction in the road, the wheel will ordinarily be deflected to one side or the other and thus throw the vehicle out of the straight course of travel. But my invention prevents this under all ordinary circumstances because it holds the wheel to the straight course and resists any tendency which the wheel might have by reason of engaging an obstruction to become deflected from its straight course. Thus my invention provides a safety steer for motor vehicles which greatly helps the driver in steering the vehicle. Furthermore, it relieves the vehicle of many shocks and jolts to which it would be otherwise subjected in ordinary travel over rough roads because it causes the vehicle to travel squarely in a straight course over ordinary soft and rough places. With my invention the driver may drive the vehicle for a great portion of the time with relaxed muscles and no harm will result if he temporarily removes his hands from the steering wheel because the friction plunger will hold the car to its true straight course on rough roads and overcome the deflecting tendency of irregularities and inequalities in the road.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. In a steering gear, a steering shaft, a steering wheel for rotating said shaft, a fixed cam having a seat and similar cam faces on each side of said seat, and means carried by said steering shaft adapted to cooperate with said cam to normally maintain said steering wheel in position to direct the vehicle in a straight line.

2. In a steering gear, a steering wheel, a fixed cam having two oppositely disposed eccentric surfaces, and means operatively connected with said wheel adapted to yieldingly bear on said eccentric surfaces and urge said wheel to a position to direct the vehicle in a straight line.

3. In a steering gear, a steering wheel, a fixed member having a seat, yielding means operatively connected with said steering wheel and adapted to rest on said seat, and cams on said fixed member at each side of said seat and in the path of said yielding means when said steering wheel is rotated.

4. In a steering gear, a steering wheel, a cam having a seat and a cam surface on each side thereof, and means operatively connected with said steering wheel adapted to yieldingly traverse the surface of said cam when the steering wheel is rotated, said cam surfaces being formed to resist movement of said means from said seat.

5. In a steering gear, a steering wheel, a cam having a seat and like surfaces adjacent to said seat and extending outwardly relative to the axis of said wheel, and means operatively connected with said wheel and cooperating with said cam surfaces to maintain said wheel in position to direct the vehicle in a straight line.

6. The combination with the steering wheel of a motor vehicle, of a standard for said wheel, a cam rigidly mounted on the standard and having a depressed seat, a yielding plunger carried by the wheel and engaging the cam and adapted to automatically center the wheel when engaged with said seat.

7. The combination with the steering wheel of a motor vehicle, of a standard for said wheel, a cam rigidly mounted on the standard beneath the wheel and having a depressed seat, a flat portion, and cam surface extending from said seat to the flat portion, and a yielding plunger carried by the wheel and engaging said cam to automatically center the wheel when engaged with said seat.

PERRY S. BAUER.